3,218,204
USE OF HYDROGEN HALIDE AS A CARRIER GAS IN FORMING II-VI COMPOUND FROM A CRUDE II-VI COMPOUND
Robert A. Ruehrwein, Clayton, Mo., assignor to Monsanto Company, a corporation of Delaware
No Drawing. Filed July 13, 1962, Ser. No. 209,739
15 Claims. (Cl. 148—175)

This application is a continuation-in-part of co-pending U.S. application Serial No. 143,882 filed October 9, 1961.

The present invention relates to a method for the production of epitaxial films of single crystals of inorganic compounds. Epitaxial films which may be prepared in accordance with the invention described herein are prepared from compounds broadly defined as compounds formed from the elements beryllium, zinc, cadmium and mercury of Group II of the periodic system with the elements sulfur, selenium and tellurium of Group VIB. Typical compounds within this group include the binary compounds beryllium sulfide, zinc selenide, cadmium telluride, mercury selenide and cadmium sulfide. As examples of ternary compositions within the defined group are those having the formulae $ZnS_xSe_{(1-x)}$ and $CdS_xSe_{(1-x)}$, $x$ having a numerical value greater than zero and less than 1.

It is a further object to provide a method for the production of single crystals of these compounds from crude forms thereof whether amorphous or crystalline.

A further object of this invention is the chemical purification of the above class of compounds by a method heretofore unknown.

A still further object of this invention is formation and deposition of epitaxial films of the above-described materials upon substrates of the same or different materials.

Further objects and advantages of the invention will become apparent as the description proceeds.

The present process for the production of large single crystals of the above-described compounds, typified by cadmium sulfide, is based upon a chemical reaction which occurs when a crude polycrystalline form of the compound reacts with a hydrogen halide, e.g., hydrogen chloride, hydrogen bromide or hydrogen iodide, to form a complex mixture, the vapor of which is then conducted to a cooler zone wherein the original compound is reconstituted or reformed and deposits in very pure single crystal form. Hydrogen may be conveniently employed as a diluent for the hydrogen halide gas although other diluents such as helium may be used.

The compound used as the source material may be of any desired purity. For example, in the preparation of an electronic grade cadmium sulfide in which very large crystals are desired, a relatively pure form of cadmium sulfide is desirably employed as the starting material. However, amorphous cadmium sulfide and other crude sources are also applicable. The hydrogen and hydrogen halide gas may be used from a normal commercial supply such as from cylinders or by conventional preparative means.

It will be seen that the instant process includes not only a conversion of polycrystalline compounds to a single crystal form or epitaxial form, but also as a dual feature, a novel method of purification of these compounds.

Prior art methods of purification include distillation and recrystallization which rely upon differences in vapor pressures or boiling points between the impuritiy and the host material. By these methods the material to be purified is placed in a suitable reactor such as a silica or alumina tube and evaporated or sublimed along the tube by adjusting the position and the temperature of the furnace. In these methods carrier gas as helium or hydrogen may be used to conduct the distilled material to the cooler regions or to remove impurities.

In the present method the hydrogen halide is a critical reactant and may not be omitted, as can the carrier gas in the prior art method just described. When, as in the instant invention, a II-VI compound is heated to sufficiently high temperature in the presence of a hydrogen halide a chemical reaciton occurs, as exemplified below with CdS and HCl which from equilibrium data and analyses is as follows:

$$CdS(s) + 2HCl(g) \xrightleftharpoons{600°\,C.} CdCl_2(g) + H_2S(g)$$

The reaction mixture is then conducted to a cooler zone where a second reaction, the reverse of that in the equation, occurs and cadmium sulfide is deposited in a very pure state and in single crystal form.

The apparatus employed in carrying out the process of the present invention may be any of a number of types. The simplest type constitutes a closed tube of a refractory material such as glass, quartz or a ceramic tube such as mullite into which the crude reactant material is introduced into one end of the tube, the substrate material is placed in the other end of the tube, and hydrogen and hydrogen halide vapor introduced. The tube is then sealed off and the end containing the reactant material is subjected to temperatures within the range of from 200° C. to 1900° C. and the end of the tube containing the substrate material is subjected to a lower temperature within the range of from 195° C. to 1895° C. The tube is held under these conditions for a period of one minute to one hour or more, until deposition of the desired degree has been accomplished. In any event the reaction is carried out below the melting (or decomposition) point of the substrate or material being deposited. It is essential in the preferred embodiment that a temperature differential be maintained between the respective higher and lower temperature zones, such temperature differential being from 5° C. to 1705° C.

It is to be understood that the temperature ranges recited herein are generic to the entire group of compounds disclosed, and that the specific temperatures employed in a given system will relate to and be determined by the specific compound involved. In brief, it is only necessary to heat the first temperature region to a temperature sufficiently high to enable the compound to react with the hydrogen halide vapor. As to the temperature employed in the second temperature region, it is only necessary that it be lower than the temperature in the first temperature region by an amount sufficient to permit deposition of a single crystal form of the compound from the reaction mixture. Temperature differentials between the two temperature regions will be determined by the specific compound involved, but, in general, are within the range disclosed above. Preferred ranges of reaction temperatures for making individual products constituting species within the above general temperature range are as follows:

BeS _____ 450–1500
BeSe _____ 450–1500
BeTe _____ 450–1300
ZnS _____ 400–1500
ZnSe _____ 400–1500
ZnTe _____ 400–1200
CdS _____ 600–1500
CdSe _____ 600–1300
CdTe _____ 600–1000
HgS _____ 200–1400
HgSe _____ 200–1000
HgTe _____ 200–600

When the gaseous reaction mixture diffuses from the high temperature zone to the low temperature zone the above reverse reaction takes place and the single crystal form of the starting material deposits from the vapor phase in very pure form and having good electrical resistivity, e.g., cadmium sulfide prepared by this method has a resistivity of $2 \times 10^6$ ohm-cm.

It is within the scope of this invention, although a less preferred embodiment, to employ a single temperature reaction zone wherein the crude material is first heated to reaction temperatures within the range of 200° C. to 1500° C. in the presence of the hydrogen halide, according to the above equation to obtain the complex mixture, and then reducing the reaction zone temperatures to within the lower range defined above, i.e., between 195° C. to 1495° C. to effect a reconversion of the crude starting material to a purified single crystal form of the same material. This procedure is less preferred because it does not produce as large a yield of purified product from the same quantity of crude material and in the same amount of time as the two-zone system.

The contacting and vapor phase deposition may be carried out in a closed system which is completely sealed off after the hydrogen and hydrogen halide are introduced with cadmium sulfide (or other compound as mentioned above), or by use of a continuous gas flow system. When employing a continuous gas flow system, the hydrogen and hydrogen halide gases are advantageously introduced at the rate of from 1 cc./min. to 1000 cc./min., or preferably, from 10 cc./min. to 500 cc./min. However, best results are obtained when hydrogen flow rates are greater than hydrogen halide flow rates, i.e., by using reduced hydrogen halide:hydrogen ratios. These ratios, in general, range from 1:10 to 1000 and, preferably, from 1:50 to 1:500. The pressure in the system may be varied over a considerable range such as from 0.01 to 100 atmospheres, a preferred range being from 0.5 to 1.0 atmosphere.

On a larger scale, the present process is operated as a continuous flow system. This may constitute a simple tube in which the solid crude cadmium sulfide is located and over which source material the hydrogen and hydrogen halide gases are then passed. At the higher temperatures set forth above, the gas streams pass along the same or an additional conduit to another region maintained at a lower temperature, as described above. For example, a silica tube located in a multiple-zone electric heating furnace or a two-furnace heating system may thus be employed to produce the first zone higher temperature followed by a zone of lower temperature in which the deposition from the vapor phase takes place to yield the purified epitaxial or single crystal product. Various other modifications including horizontal and vertical tubes are also contemplated, and recycle systems in which the exit gas after deposition of the single crystal product is returned to the system is also desirable, particularly in larger scale installations.

A particularly advantageous feature of the instant invention is the provision of a simple means of purification of the various commercially important compounds described above. As noted hereinbefore, prior art methods have certain disadvantages, e.g., conventional distillation and recrystallization techniques depend upon vapor pressure and boiling point differentials between impurities and host materials, and further, often require carrier gases to remove evaporated impurities but which do not combine with the host material, e.g., inert gases, nitrogen, etc. By the present method, however, no reliance is placed upon these techniques. The instant purification is based upon the use of the reactant hydrogen halide which combines both with the host material and with those impurities which do combine with the hydrogen halide at the temperature present in the high temperature region of the reaction zone. When the thus formed complex mixture then enters the low temperature region of the reactor, the crude starting material is reconstituted into its original composition and deposited as an epitaxial layer or single crystal form from the vapor, but less the undesired impurities originally present, which impurities, combined with the hydrogen halide are more stable at lower temperatures than the host material and so, remain in the vapor phase and are removed as exit gases. Hydrogen is employed herein to flush oxidizing gases from the system and as a diluent thus stabilizing the reaction, but it takes no part in the chemical reaction.

Among the more common impurities found in the above starting materials might be mentioned silicon, magnesium, copper and iron, although these are not the only impurities encountered in actual practice. In certain embodiments of the invention it is desirable and necessary that the starting material have some impurities present and unaffected by the hydrogen halide throughout the reaction. In such cases the impurity is within certain limitations a desired constituent. This feature will be discussed hereinafter in connection with doping treatments of the materials when used in certain electronic devices.

In addition to the purification feature of this invention, another important aspect is the provision of a means of preparing and depositing epitaxial films of the purified single crystal host material onto various substrates. These deposited films permit the fabrication of new electronic devices discussed hereinafter. The characteristic feature of epitaxial film formation is that starting with a given substrate material, e.g., gallium arsenide or CdTe, having a certain lattice structure, oriented in any direction, a film, layer or overgrowth of the same or different material may be vapor-deposited upon the substrate. The vapor deposit has an orderly atomic lattice and depositing upon the substrate assumes the same lattice structure and geometric configuration of the substrate. When using a certain material, e.g., gallium arsenide, as the substrate and another material, e.g., cadmium telluride as the film deposit it is necessary that lattice distances of the deposit material closely approximate that of the substrate in order to obtain an epitaxial film.

The thickness of the epitaxial film may be controlled as desired and is dependent upon reaction conditions such as temperatures within the "hot" and "cold" zones of the reactor, temperature differentials between these zones, concentrations of the hydrogen and hydrogen halide and time. In general, the formation of thicker layers is favored by large temperature gradients as defined above, and large concentrations of hydrogen halide, i.e., from about 10 mm. to 200 mm. pressure for closed systems and in open systems flow rates of from 20 cc./min. to 200 cc./min.

Although the substrate crystal may be oriented in any direction, it has been found, unexpectedly, that epitaxial films having superior physical properties, such as smoother finish and better thickness uniformity, result when crystal growth proceeds on certain crystallographic faces. The requisite crystal faces for obtaining these superior epitaxial films are the (100) and the (111)B faces, and preferably, of these the 100 crystal face. The (111)B face is the (111) face having the Group VI element exposed, e.g., in cadmium sulfide the (111)B face has sulfur atoms exposed, whereas the (111)A face had cadmium atoms exposed.

When seed crystals having other than (100) and (111)B faces exposed are employed, e.g., the (111)A and the (110) faces, the epitaxial films deposited on them, while operable, are more likely to be rough and nonuniform in thickness, and, as a result, electronic devices made with these epitaxially deposited films have a much higher incidence of non-reproducible characteristics.

As stated hereinbefore, the compounds and epitaxial films formed in accordance with this invention comprise compounds formed from elements of Group II of the periodic system and, particularly, beryllium, zinc, cadmium and mercury with elements selected from Group VI, particularly sulfur, selenium and tellurium. Included in this group of compounds are the sulfides, selenides and tellurides of beryllium, zinc, cadmium and mercury. In addition to the use of the above compounds by themselves, mixtures of these compounds are also contemplated as starting materials and as epitaxial films, e.g., zinc sulfide and cadmium telluride mixed in varying proportions, when subjected to the instant process produce suitable semiconductor materials or epitaxial films of the same compositions.

Representative individual binary crystals of the Group II and Group VI components contemplated in this invention are listed in the table below with the value of their forbidden energy gap.

TABLE I

| Compound: | Energy gap, electron volts |
|---|---|
| ZnS | 3.7 |
| ZnSe | 2.6 |
| CdS | 2.4 |
| ZnTe | 2.1 |
| CdSe | 1.77 |
| CdTe | 1.50 |
| HgSe | 0.65 |
| HgTe | 0.025 |

It is well known that combinations of these compounds can be formed to give mixed binary crystals, including ternary and quarternary compositions, which have a value of the forbidden energy gap different from those of the two parent binary crystals and usually having a value that is intermediate between those of the parent binary crystals. For example, the forbidden energy gap of $Cd_{.5}Hg_{.5}Te$ is about 0.25 electron volts. Other such combinations have the formulae $BeS_xSe_{(1-x)}$, $Be_xZn_{(1-x)}S$, $ZnSe_xTe_{(1-x)}$, $Zn_xCd_{(1-x)}Se$, $CdSe_xTe_{(1-x)}$,

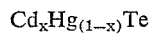

$$Cd_xHg_{(1-x)}Te$$

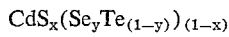

$HgSe_xTe_{(1-x)}$, $Zn_yCd_{(1-y)}Se_xTe_{(1-x)}$ and $$CdS_x(Se_yTe_{(1-y)})_{(1-x)}$$

where $x$ and $y$ have a numerical value greater than zero and less than one.

Materials useful as substrates herein include the same materials used in the epitaxial films as just described and, in addition, compounds of elements of Groups III and V (III-V compounds) and compounds of Groups I and VII elements (I-VII compounds) having the cubic (ZnS) structure, and the elements silicon and germanium, as well as metals having the cubic crystalline structure are suitable substrates. Suitable dimensions of the seed crystal are 1 mm. thick, 10 mm. wide and 15-20 mm. long, although larger or smaller crystals may be used.

As will be described hereinafter, the materials used herein either as films or substrates or both may be used in a purified state or containing small amounts of foreign materials as "doping" agents.

Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group I of the periodic system, e.g., copper, silver, and gold or an element or compound thereof selected from Group V of the periodic system, e.g., phosphorus, arsenic and antimony are incorporated into the reaction components in order to produce p-type conductivity, and an element or compound thereof from Group III, e.g., boron, aluminum, gallium and indium to produce n-type conductivity. These "impurities" are carried over with the reactant materials into the vapor phase and deposited in a uniform dispersion in the epitaxial film of the formed product on the substrate. Since the proportion of dopant deposited with the II-VI compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as $InCl_3$ to the reactants, or the dopant can be added with a separate stream of hydrogen from a separate reservoir.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1 \times 10^{15}$ to $5 \times 10^{20}$ atoms/cc. of product.

Vapor deposits of the purified material having the same conductivity type as the substrate may be utilized to form pp+ or nn+ regions.

Variations of the preceding techniques permit the formation of products having a plurality of layers of epitaxial films upon the substrate, each layer having its own electrical conductivity type and resistivity as controlled by layer thickness and dopant concentration. Since the vapor deposited material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., cadmium telluride is vapor deposited upon a substrate of indium antimonide. Subsequently, a quantity of the same material with different doping agents or different concentrations of the same dopant or another of the described materials may be vapor deposited from starting materials comprising these elements as a second epitaxial film over the epitaxial film of cadmium telluride already deposited on the substrate. This procedure with any desired combination of layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, the thickness of the epitaxial film and the impurity concentration are controllable to obtain a variety of electrical effects required for specific purposes as discussed elsewhere herein.

*Example 1*

This example illustrates the preparation of a single crystal form of purified cadmium sulfide in a closed system.

Laboratory grade polycrystalline CdS is placed in a fused silica tube with the approximate dimensions of 22 mm. outside diameter and 15 cm. long. After evacuating to about $2 \times 10^{-6}$ mm. Hg, 33 mm. pressure of anhydrous HCl is charged to the tube and contents. The tube is then sealed off. The end of the tube containing the CdS is heated to 700±10° C. while the opposite end of the tube is maintained at 575±25° C. The tube and its contents are allowed to equilibrate at these temperatures for about 24 hours, at which time the furnace is slowly cooled to room temperatrue. About 10% of the charged CdS has been transported to the cooler region of the tube. The deposited CdS consists of well-defined clusters of single crystals with dimensions of about 1–2 mm. in all directions.

*Example 2*

This example illustrates the preparation of a single crystal form of purified CdS in an open system arrangement.

A fused silica tube, about 22 mm. outside diameter by 36" long, is placed in two adjacent 13" furnaces. Polycrystalline laboratory grade CdS is placed in the first of these furnaces. After flushing with hydrogen having a flow rate of about 1000 cc./min. the furnace containing the CdS is heated to 700±10° C. and HCl at a rate of about 10 cc./min. is then introduced into the tube with the hydrogen and allowed to pass over the CdS. After 185 minutes the hydrogen chloride flow is stopped and the furnaces are cooled down while the hydrogen flow is continued to remove traces of HCl. Most of the CdS source material in the reaction tube in the first furnace is found to have been transported to the cooler area of the tube in the second furnace maintained at a temperature of about 550° C. during deposition of the CdS. This product is of single crystal form.

*Example 3*

This example illustrates the preparation of single crystal ZnSe in an open system.

The experimental arrangement is similar to that described in Example 2, that is, a fused silica tube, open at both ends, is placed in two adjacent furnaces and laboratory grade polycrystalline ZnSe are charged to the tube. The furnace containing the ZnSe is heated to about 650° C. and the second furnace is heated to 580–600° C. HCl at a rate of 20 cc./min. and hydrogen at the rate of 500 cc./min. is allowed to flow through the ZnSe for about 75 minutes. After the bulk of the original charge has been transported from the hot region of the first furnace both furnaces are allowed to cool and the product recovered. In this type of experiment, up to 50% of the ZnSe which is reacted in the higher temperature region is recovered in the deposition zone of the tube in the cooler furnace.

*Example 4*

This example illustrates the formation and deposition of an epitaxial film of p-type cadmium sulfide on n-type aluminum arsenide as a substrate oriented (100). The experimental arrangement in this example is such that a fused silica reaction tube is positioned in two furnaces butted end to end. In one end of the silica tube is placed polycrystalline p-type cadmium sulfide doped with silver to a level of about $1 \times 10^{20}$ carriers/cc. In the other end of the fused silica tube is placed a seed wafer substrate of single crystal n-type aluminum arsenide containing about $1 \times 10^{17}$ carriers/cc. oriented in such manner that the (100) crystallographic face is exposed to the reaction mixture from which an epitaxial film is to be deposited. By means of the two furnaces the fused silica tube is heated in such manner that the polycrystalline cadmium sulfide source material is heated to a temperature of about 680° C. while that portion of the silica tube holding the aluminum arsenide seed crystal is maintained at about 600° C.

A stream of hydrogen gas is passed through the reaction and deposition zones at a rate of about 100 cc./min. during the period when the reaction zone is heating up to reaction temperatures. The hydrogen serves to flush impurities such as oxygen from the system and from the surface of the seed crystal substrate. When the temperatures within the reaction and deposition zones have reached the desired levels a stream of hydrogen chloride is introduced into the hydrogen stream at a rate of about 10 cc./min. and this mixture passed over the aluminum arsenide source material and seed crystal. The hydrogen functions as a diluent for the hydrogen halide and, also tends to moderate or inhibit the reaction of the hydrogen chloride with the source material. After the reaction and deposition has proceeded for about 1.5 hours, the hydrogen chloride flow is terminated, but the hydrogen flow continued while the system cools.

The seed crystal is then reweighed and found to have increased by about 0.020 g. This increase represents the amount of cadmium sulfide deposited upon the seed crystal.

Upon examination, the product is found to have a very smooth and uniform surface film about 4.0 microns thick and having a high mirror polish. X-ray diffraction patterns show that the film is single crystal and oriented in the same manner as the single crystal aluminum arsenide substrate. Point contact rectification tests showed that a p-n junction with very sharp breakdown exists between the film and substrate.

Electrical measurements of the film indicate a resistivity of about 0.139 ohm-cm. In a duplicate run of this process, the film has a resistivity of about 0.137 ohm-cm. and exhibits about 10 imperfections per cm.$^2$.

As an illustration of the superior product obtained by using the (100) orientation, a run identical to that described in this example is made using, however, an aluminum arsenide seed crystal oriented (111)B. This orentation is selected for comparative purposes since it produces better films than the other aforementioned crystal orientations. In this run, the aluminum arsenide substrate increases in weight by only about 0.005 g. and the film exhibits about 200 imperfections per cm.$^2$.

When this example is repeated utilizing BeTe as source material, the product produced thereby is found to have an epitaxial film of BeTe deposited on the AlAs seed crystal.

The process according to this example is likewise applicable to the other II–VI compounds described above.

*Example 5*

This example illustrates the formation and deposition of an epitaxial film of n-type ZnSe on p-type GaAs as the substrate.

The experimental arrangement is much the same as in the preceding example. In this experiment polycrystalline n-type ZnSe doped with Ga to a level of about $1 \times 10^{20}$ carriers/cc. is placed in one end of a fused silica tube, located in two adjacent furnaces. The seed wafer substrate is a p-type single crystal GaAs sample doped with tellurium to a level of about $5.8 \times 10^{18}$ carriers/cc. is placed in the other end of the silica tube which is maintained at about 625° C. That portion of the silica tube containing the ZnSe is heated to about 650° C. Hydrogen at a rate of about 1000 cc./min. and HBr at a rate of about 10 cc./min. are introduced into the silica tube and allowed to flow through the tube for about 2 hours. When the seed wafer is re-weighed it is found that about 0.050 g. of ZnSe has been deposited on the surfaces of the seed. X-ray diffraction patterns of the substrate wafer show that the deposit is also single crystal and oriented in the same fashion as the substrate. Point contact rectification tests show that a p-n junction exists at the region of the junction between the epitaxial layer and the substrate.

A variation of this example is to introduce $GaCl_3$ dopant source into the reaction system from a separate reservoir by means of a stream of hydrogen.

Example 6

This example is similar to Example 5, but illustrates the deposition of an epitaxial layer of HgTe on a substrate of AgI, a typical I–VII compound.

The HgTe source in this example is polycrystalline in form. The seed wafer substrate is single crystal, oriented (111)B, AgI. The reaction zone is heated to 360° C. and the deposition zone to 325° C. Hydrogen at a rate of 500 cc./min. and hydrogen iodide at a rate of ten cc./min. are flowed through the tube for about 3 hours. The seed wafer when re-weighed is found to have accepted about 0.036 g. of deposited HgTe. The deposit is epitaxial, that is, an X-ray diffraction diagram shows the same orientation as the original wafer.

The crystal is then lapped and metallic leads attached to the HgTe epitaxial film deposited on the AgI base. In a magnetic field, the structure exhibits a large Hall voltage and is, therefore, suitable for use as a Hall generator. This example further illustrates the utilization of a semiconductor body, i.e., the HgTe film, on a nonconductor base material, i.e., AgI which arrangement provides unique and extended applications for device fabrication.

While the foregoing example has illustrated the use of single crystal I–VII compounds using silver iodide as the substrate, in a similar manner the fluorides, chlorides, bromides and iodides of copper, silver and gold having the zinc blende structure are likewise used as substrates for epitaxial overgrowths of II–VI compounds. Similarly, single crystal I–VII compounds having the cubic sodium chloride type structure may be used as substrate for epitaxial growth of II–VI compounds when the I–VII crystal face upon which growth is to occur is the (111) crystallographic face. In this manner, the fluorides, chlorides, bromides and iodides of sodium, lithium, potassium, rubidium and cesium are used as substrates. Preferred I–VII compounds include copper fluoride, copper chloride, copper bromide, copper iodide, and silver iodide.

Example 7

This example illustrates the preparation of mixed single crystals of II–VI compounds, typified by CdS and CdTe from a polycrystalline mixture of the same.

Laboratory grade CdS and CdTe are charged to an open end tube, as described in previous examples. Hydrogen at a flow rate of about 400 cc./min. and HCl at a flow rate of 10–20 cc./min. are passed through the tube for about 3 hours. The CdS–CdTe mixture is maintained at about 800° C. in the hotter region of the tube and the cooler region at 650° C. The mixture deposits in single crystal form in the cooler region and is found to transmit red light. Optical absorption measurements indicate that the forbidden energy gap is about 1.8 ev., indicating that the deposited material is a mixed crystal richer in tellurium than sulfur.

When this example is repeated using a p-type starting material and an n-type substrate, e.g., zinc selenide, the transported source material deposits on the substrate as an epitaxial film about 0.1 mm. thick having the same single crystal lattice orientation as the substrate. The p-type film and n-type substrate form a p-n junction and exhibits rectification.

When thinner films are desired, the reaction time may be shortened or thinner films may be obtained by decreasing the temperature differentials between the hot and cold zones and/or decreasing the flow rate of the hydrogen halide.

While the foregoing example has illustrated the use of typical single crystal II–VI compounds both as mixtures and as individual compounds as the substrate, in a similar manner the sulfides, selenides and tellurides of beryllium, zinc, cadmium, and mercury are likewise used as substrates for epitaxial overgrowths of II–VI compounds. Similarly, single crystal II–VI compounds having the cubic sodium chloride type structure may be used as substrates for epitaxial growth of the II–VI compounds when the II–VI crystal face upon which growth is to occur is the (111) crystallographic face. In this manner, the oxides, sulfides, selenides and tellurides of magnesium, calcium, strontium and barium, as well as cadmium oxide, are used as substrates. Preferred II–VI compounds include zinc sulfide, zinc selenide, zinc telluride, cadmium sulfide, cadmium selenide, cadmium telluride, mercury sulfide, mercury selenide, mercury telluride, beryllium sulfide, beryllium selenide and beryllium telluride.

Example 8

A variation of the preceding example is the utilization of three-component or four-component mixed binary crystals of II–VI compounds as a source material for the deposition of epitaxial films of the same material. For example, a seed crystal of zinc telluride is positioned in the deposition zone of a silica reaction tube heated to about 600° C. In the reaction zone, heated to about 700° C., is located a quantity of a polycrystalline mixed crystal, $ZnSe_{0.5}Te_{0.5}$. Hydrogen at a rate of 400 cc./min. and hydrogen chloride at a rate of 10 cc./min. are flowed over the source material for approximately three hours until substantially all of the starting material has been reacted with the hydrogen chloride and transported to the deposition zone. In the latter zone, the starting material is reconstituted and deposited in purer, single crystal form as an epitaxial film on said substrate. Like results are obtained when a four-component mixed crystal material, e.g., $Cd_{0.4}Hg_{0.6}Se_{0.5}Te_{0.5}$, is utilized as starting material and deposited as an epitaxial film under similar reaction conditions.

In this and preceding examples, germanium and silicon are suitably employed as substrate materials in place of the respective substrates mentioned.

Example 9

This example illustrates a procedure for producing a product having a plurality of epitaxial layers of compounds according to the present invention.

The procedure is essentially the same here as described in preceding examples, except that a plurality of source materials contained in separately controlled reaction zones leading to a common deposition zone are used instead of a single reaction zone. Each reaction zone has separate means for temperature control and for the introduction of hydrogen and hydrogen halide.

In operation, a fused silica reaction tube containing in the deposition zone thereof a seed crystal of n-type ZnTe ($5.8 \times 10^{18}$ carriers/cc.) and p-type HgSe as the source material, is heated to about 500° C. in the reaction zone and about 450° C. in the deposition zone. Hydrogen is flowed over the source material at a rate of 600 cc./min. and hydrogen halide at 20 cc./min. for approximately 15 minutes to complete the reaction, transfer and deposition of the HgSe as an epitaxial film on the ZnTe substrate. Thereafter, a second reaction tube containing therein ZnSe heated to 550° C. and connected to the same aforementioned deposition zone is opened to the deposition zone while hydrogen and hydrogen chloride are allowed to flow over the ZnSe at the above rates. After about 20 minutes the ZnSe is transported to the deposition zone heated to 450° C. where the ZnSe (n-type) deposits as a second epitaxial layer on the first HgSe layer. This procedure may be repeated any number of times to obtain a plurality of epitaxial layers, each having its own conductivity or resistivity. Dopants are supplied either in the starting material or from separate sources leading to the reaction zone.

When electrical leads are connected to the three separate npn regions of the crystal prepared in this example, the crystal exhibits transistor action.

It will be seen that the products obtained according to the present invention have a variety of applications. For example, in electronic devices where it is desirable to have a substantially inert non-conducting base for II-VI epitaxially filmed semiconductors, the product described in Example 6 is highly suitable. Where it is desired to obtain semiconductor components having semiconducting properties in the base material as well as in the epitaxial film, those products described in Examples 4, 5, 7 and 9 above are of particular value.

Electronic devices may also be fabricated wherein a semiconducting component comprising an epitaxial film of II-VI compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such Al-Zn, SbCoMn, BTi and $Cr_2Ti$.

Various other modifications of the instant invention will be apparent to those skilled in the art without departing from the spirit and scope thereof.

I claim:

1. Process for the production of a single crystal form of a compound comprising at least one element selected from the group consisting of beryllium, zinc, cadmium and mercury with at least one element selected from the group consisting of sulfur, selenium and tellurium which comprises reacting a crude source of said compound with hydrogen halide vapor at a first temperature within the range of from 200° C. to 1900° C., and subjecting the resulting gaseous reaction mixture to a region of a second and lower temperature sufficient to deposit a single crystal form of the said compound from said gaseous reaction mixture.

2. Process according to claim 1 wherein said compound and hydrogen halide react in the presence of molecular hydrogen.

3. Process for the production of a single crystal form of cadmium sulfide which comprises reacting a crude source of said cadmium sulfide with hydrogen halide vapor at a first temperature within the range of from 600° C. to 1500° C., and subjecting the resulting gaseous reaction mixture to a region of a second and lower temperature sufficient to deposit a single crystal form of cadmium sulfide from the gaseous reaction mixture.

4. Process according to claim 3 wherein said hydrogen halide is hydrogen chloride.

5. Process according to claim 3 wherein said cadmium sulfide and hydrogen halide react in the presence of molecular hydrogen.

6. Process for the production of a single crystal form of mixed binary crystals of compounds comprising elements of Group II selected from the class consisting of beryllium, zinc, cadmium and mercury with an element selected from the Group VI selected from the group consisting of sulfur, selenium and tellurium which comprises reacting a crude source of said mixed binary crystals with hydrogen halide vapor at a first temperature within the range of from 200° C. to 1900 C. and subjecting the resulting gaseous reaction mixture to a region of a second and lower temperature sufficient to deposit a single crystal form of mixed binary crystals from said gaseous reaction mixture.

7. Process for the production and deposition of epitaxial films of compounds comprising combinations of Group II elements selected from the class consisting of beryllium, zinc, cadmium and mercury with Group VI elements selected from the class consisting of sulfur, selenium and tellurium onto a substrate material crystallographically compatible with said deposited films and selected from the class consisting of I-VII, II-VI and III-V compounds, germanium and silicon, which comprises reacting a crude source of at least one of said compounds with hydrogen halide vapor at a first temperature within the range of from 200° C. to 1900° C., and subjecting the resulting gaseous reaction mixture to a region of a second and lower temperature sufficient to deposit a purified single crystal form of at least one of said compounds from said gaseous reaction mixture as an epitaxial film upon said substrate.

8. Process according to claim 7 wherein said epitaxial film is deposited upon a substrate which comprises a I-VII compound.

9. Process according to claim 8 wherein said epitaxial film comprises mercury telluride and said substrate is silver iodide.

10. Process according to claim 7 wherein said epitaxial film is deposited upon a substrate comprising a II-VI compound.

11. Process according to claim 10 wherein said epitaxial film comprises zinc selenide and said substrate is zinc telluride.

12. Process according to claim 7 where said epitaxial film is deposited upon a substrate comprising a III-V compound.

13. Process according to claim 12 wherein said epitaxial film comprises zinc selenide and said substrate comprises gallium arsenide.

14. Process according to claim 7 wherein said crude source of said compound and said hydrogen halide react in the presence of elemental hydrogen.

15. Process according to claim 7 wherein a small amount of doping agent is present in said gaseous reaction mixture to provide epitaxial films having the desired electrical conductivity type and resistivity.

References Cited by the Examiner

UNITED STATES PATENTS

| | | | |
|---|---|---|---|
| 2,692,829 | 10/1954 | Christensen et al. | 148—1.5 |
| 2,798,989 | 7/1957 | Welker | 148—1.5 |
| 2,858,275 | 10/1958 | Folberth | 148—1.5 XR |
| 2,974,064 | 3/1961 | Williams et al. | 252—62.3 |
| 3,072,507 | 1/1963 | Anderson | 148—33.4 |

FOREIGN PATENTS

| | | |
|---|---|---|
| 1,193,194 | 10/1959 | France. |
| 1,029,941 | 5/1958 | Germany. |

OTHER REFERENCES

Anderson, "Germanium-Gallium Arsenide Heterojunctions," IBM Journal of Research and Development, vol. 4, No. 3, July 1960, pp. 283–287.

Holonyak et al., Article in AIME Publication of Metallurgy of Semiconductor Materials, Aug. 30–Sept. 1, 1961, vol. 15, Interscience Publishers, pp. 49–59.

Lyons et al., "Forming a Compound PN Junction," IBM Technical Disclosure Bulletin, vol. 3, No. 8, January 1961, p. 31.

Marinace, "Vapor Growth of InSb Crystals by an Iodine Reaction," IBM Technical Disclosure Bulletin, vol. 3, No. 8, January 1961, p. 33.

DAVID L. RECK, *Primary Examiner.*

RAY K. WINDHAM, *Examiner.*